United States Patent
Hoppe et al.

(10) Patent No.: US 10,757,410 B1
(45) Date of Patent: Aug. 25, 2020

(54) SPATIALLY ADAPTIVE VIDEO COMPRESSION FOR MULTIPLE STREAMS OF COLOR AND DEPTH

(71) Applicant: GOOGLE LLC, Mountain View, CA (US)

(72) Inventors: Hugues Hoppe, Mercer Island, WA (US); True Price, Chapel Hill, NC (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/523,247

(22) Filed: Jul. 26, 2019

(51) Int. Cl.
*H04N 19/126* (2014.01)
*H04N 19/176* (2014.01)

(52) U.S. Cl.
CPC ......... *H04N 19/126* (2014.11); *H04N 19/176* (2014.11)

(58) Field of Classification Search
None
See application file for complete search history.

(56) References Cited

U.S. PATENT DOCUMENTS

2015/0249841 A1* 9/2015 Yu .......................... H04N 19/70
375/240.02

* cited by examiner

*Primary Examiner* — Talha N Nawaz
(74) *Attorney, Agent, or Firm* — Brake Hughes Bellermann LLP

(57) ABSTRACT

Techniques of compressing color video images include computing a delta quantization parameter ($\Delta QP$) for the color images based on a similarity between the depth image surface normal and the view direction associated with a color image. For example, upon receiving a frame having an image with multiple color and depth images, a computer finds a depth image that is closest in orientation to a color image. For each pixel of that depth image, the computer generates a blend weight based on an orientation of a normal to a position of the depth image and the viewpoints from which the plurality of color images were captured. The computer then generates a value of $\Delta QP$ based on the blend weight and determines a macroblock of color image corresponding to the position, the macroblock being associated with the value of $\Delta QP$ for the pixel.

20 Claims, 6 Drawing Sheets

SPATIALLY ADAPTIVE VIDEO COMPRESSION FOR MULTIPLE STREAMS OF COLOR AND DEPTH

TECHNICAL FIELD

This description relates to compression of video images.

BACKGROUND

Some computers configured to generate color video images of objects transmit the color video images over a network using a compression scheme. The technical problem is to transmit a color video image of an object over the network using as small a bitrate as possible. Conventional approaches to solving this technical problem include associating a delta quantization parameter (ΔQP) value to respective macroblocks (e.g., 32×32 pixels) of each video frame. In this way, a user can selectively increase or decrease the quality of the video in particular spatial regions of the frame.

SUMMARY

In one general aspect, a method can include receiving (i) depth image data representing a plurality of depth images of an object, each of the plurality of depth images being a depth image of the object captured from a respective viewpoint, and (ii) color image data representing a plurality of color images, each of the plurality of color images (a) being a color image of the object captured from a respective viewpoint and (b) having a plurality of macroblocks, each of the macroblocks corresponding to a respective region of the color image. The method can also include, for a color image of the plurality of color images: identifying a depth image of the plurality of depth images associated with the color image; for each pixel of the depth image: determining a position of a surface of the object based on a depth value of the depth image associated with that pixel; generating a value of a combination parameter corresponding to the determined position, the value of the combination parameter being based on a similarity between a surface normal of the depth image at the position and the viewpoint from which the depth image was captured; generating a value of a delta quantization parameter (ΔQP) based on the blend weight; and determining a macroblock of the plurality of macroblocks of the color image corresponding to the position, the macroblock being associated with the value of ΔQP for the pixel. The method can further include performing a compression operation on the color image, a compression ratio of each of the plurality of macroblocks of the color image being based on the value of ΔQP with which the macroblock is associated.

The details of one or more implementations are set forth in the accompanying drawings and the description below. Other features will be apparent from the description and drawings, and from the claims.

DETAILED DESCRIPTION

Figure 1:
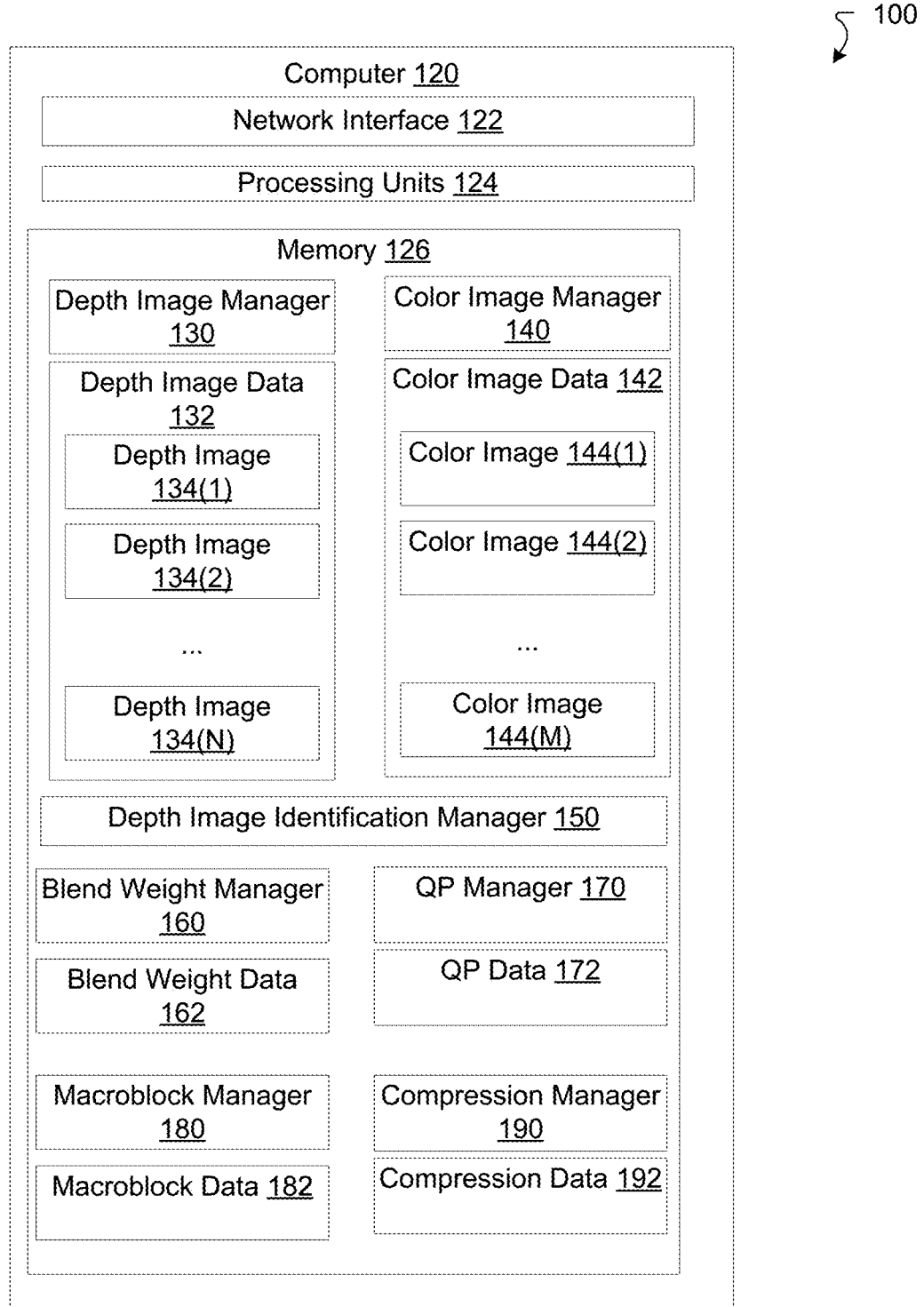
FIG. 1 is a diagram that illustrates an example electronic environment for implementing the technical solution described herein.

Some color video systems achieve real-time transmission of color video by exploiting hardware video encoding and decoding of multiple streams of video, for example three depth views and four color views. These views are fused in a receiver to create low-latency left/right views based on the receiver's tracked eyes.

For such systems, a general problem is reducing a network transmission bitrate required by the video streams, in particular by the plurality of color views. Conventional approaches to reducing the network transmission bitrate includes selectively increasing or decreasing the quality of the video in particular spatial regions of the frame. For example, in a teleconferencing scenario, such conventional approaches may be used to keep greater detail on a user's face while allowing other parts of the frame to have reduced quality. Other conventional approaches attempt to preserve the quality of each of multiple color images; this is done by adapting the quality of view images (e.g., by compressing the compression quality spatially) with the aim of allowing a high-quality rendering of the final object as a combination of the compressed views.

A technical problem involved in the above-described conventional approaches to the network transmission bitrate is that such approaches are not effective in the presence of multiple color and depth views. For example, there is substantial overhead present in the redundancy of the color views, i.e. the fact that a point in the environment is often visible in several of the color views. Such redundancy is not addressed in the conventional approaches.

In contrast to the conventional approaches to solving the above-described technical problem, a technical solution to the above-described technical problem includes computing a delta quantization parameter (ΔQP) for the color images based on a similarity between the depth image surface normal and the view direction associated with a color image. For example, upon receiving a frame having an image with multiple color and depth images, a computer finds a depth image that is closest in orientation to a color image. For each pixel of that depth image, the computer generates a blend weight based on an orientation of a normal to a position of the depth image and the viewpoints from which the plurality of color images were captured. The computer then generates a value of ΔQP based on the blend weight and determines a macroblock of color image corresponding to the position, the macroblock being associated with the value of ΔQP for the pixel. The computer then performs a compression operation on that color image, a compression ratio of each of the plurality of macroblocks of the color image being based on the value of ΔQP with which the macroblock is associated.

A technical advantage of the above-described technical solution is that the technical solution allows for more efficient compression of color video images with multiple color and depth images because redundant information is reduced or eliminated. This efficiency is achieved by identifying content in the input color images that will not contribute to the final blended rendering, and degrading the compression quality of that content.

In a color video system improved according to the technical solution, left/right views rendered in a receiver are created by (i) geometrically fusing the multiple depth views to create a surface in 3D and (ii) blending the multiple color views over this fused surface. The color views are blended together at each surface point according to blend weights, where a blend weight associated with each view is a function of (i) whether the surface point is visible in the view (i.e. not occluded or outside the field of view) and (ii) a similarity between the surface normal and the view direction.

Note that a pixel in a color view may contribute only a small blend weight in the color reconstruction of the scene surface because either (i) the view ray through the pixel does not intersect the scene surface and instead sees the background or (ii) the ray intersects a surface obliquely such that another view provides a better (more head-on) coverage at that surface point. Accordingly, if a block of pixels in a color view all contribute small blend weights, one may compress that block with lower quality (using a higher QP value) without affecting the quality of the final reconstruction.

FIG. 1 is a diagram that illustrates an example electronic environment 100 in which the above-described improved techniques may be implemented. As shown, in FIG. 1, the example electronic environment 100 includes a computer 120.

The computer 120 is configured to compress color images. The computer 120 includes a network interface 122, one or more processing units 124, and memory 126. The network interface 122 includes, for example, Ethernet adaptors, and the like, for converting electronic and/or optical signals received from a network to electronic form for use by the computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the computer 120 can be, or can include processors (e.g., processing units 124) configured to process instructions stored in the memory 126. Examples of such instructions as depicted in FIG. 1 include a depth image manager 130, a color image manager 140, a depth image identification manager 150, a blend weight manager 160, a quantization parameter manager 170, a macroblock manager 180, and a compression manager 190. Further, as illustrated in FIG. 1, the memory 126 is configured to store various data, which is described with respect to the respective managers that use such data.

The depth image manager 130 is configured to receive depth image data 132. The depth image manager 130 receives the depth image data 132, in some implementations, over a network via the network interface 122. In some implementations, the depth image manager 130 receives the depth image data 132 from a local storage device, e.g., a hard drive, a flash drive, a storage disk, and so on.

The depth image data 132 represents a plurality of depth images 134(1) . . . 134(N) of an object. Each depth image, e.g., depth image 134(1), represents a map of distances along a line from a camera to pixels on the surface of the object. The camera is oriented with respect to the object at an angle indicated by a viewpoint from which the depth image is captured. In some implementations, each of the plurality of depth images 134(1) . . . 134(N) has a plurality of pixels, where each pixel is associated with a depth value. In some implementations, each depth image represents the depth value (z) of the surface point in the reference frame of an image capture device (e.g., a camera).

The color image manager 140 is configured to receive color image data 142. The color image manager 140 receives the color image data 142, in some implementations, over a network via the network interface 122. In some implementations, the color image manager 140 receives the color image data 142 from a local storage device, e.g., a hard drive, a flash drive, a storage disk, and so on.

The color image data 142 represents a plurality of color images 144(1) . . . 144(N) of an object. Each depth image, e.g., color image 144(1), represents a map of distances—or depths—along a line from a camera to pixels on the surface of the object. The camera is oriented with respect to the object at an angle indicated by a viewpoint from which the depth image is captured.

The depth image identification manager 150 is configured to identify a depth image of the plurality of depth images associated with that color image. In some implementations, the depth image identification manager 150 identifies, as the depth image associated with a color image (e.g., color image 134(1)), a depth image (e.g., depth image 144(1)) having a center of projection closest to a center of projection of the color image 134(1). Such an identification is further described with regard to FIG. 3A.

The blend weight manager 160 is configured to determine a position of the color image based on a depth value of the depth image associated with a pixel of the depth image and generate a blend weight corresponding to the determined position to produce blend weight data. In some implementations, the position is a three-dimensional world-space position. In some implementations, the blend weight manager 160 is configured to normalize the blend weights across the plurality of color images.

The blend weight data 162 represents the respective blend weight computed for each pixel of each depth image. In some implementations, the blend weight for the pixel of the depth image is based on an inner product of a normal of the surface of the object at the position and the viewpoint from which the color image is captured. In some implementations, the blend weight for that pixel is proportional to the inner product raised to the power of a specified exponent. In some implementations, the blend weight for that pixel is further based on whether a point at the position is visible along the viewpoint from which the color image is captured.

The quantization parameter (QP) manager 170 is configured to generate, as the QP data 172, a value of a delta quantization parameter ($\Delta QP$) for each of the plurality of pixels based on the blend weight for that pixel. In some implementations, $\Delta QP$ is based on normalized weights.

The QP data 172 represents the $\Delta QP$ values across pixels of each color image and, ultimately, across macroblocks across each color image. It is understood that a QP determines a step size for associating coefficients of a discrete cosine transform (DCT) of a color image with a finite set of steps. Large values of QP represent big steps that crudely approximate the transform, so that most of the signal can be captured by only a few coefficients. Small values of QP more accurately approximate the block's spatial frequency spectrum, but at the cost of more bits. In H.264, each unit increase of QP lengthens the step size by 12% and reduces the bitrate by roughly 12%.

The macroblock manager 180 is configured to determine a macroblock of the plurality of macroblocks of the color image corresponding to the position to produce macroblock data 182. Ultimately, the macroblock is associated with an aggregate (e.g., mean, median, maximum, minimum) value of ΔQP for the pixel of the depth image (e.g., is based on the value of ΔQP for the pixel of the depth image). In some implementations, the macroblock manager 180 is configured to project a point at the position of the surface into a color image plane in which a camera is situated to determine the macroblock associated with the value ΔQP for the pixel.

In some implementations, the macroblock manager 180 is configured to perform a rasterization operation on the point into a framebuffer associated with the color image to store a new value of ΔQP in a pixel of a plurality of pixels of the framebuffer. The framebuffer also includes a plurality of tiles, each of the plurality of tiles including a set of pixels of the framebuffer. In this case, the macroblock manager 180 is further configured to perform a read operation on a tile of the framebuffer corresponding to a macroblock to produce an aggregated value of ΔQP. The aggregated value of ΔQP is based on the new values of ΔQP of the tile.

The macroblock data 182 represents matrices of values of ΔQP over the macroblocks of each color image. If the color image is easily viewed from the depth image surface, then the weight will be large and the value of ΔQP for the macroblock to which the point associated with the pixel is projected will be accordingly small, and vice-versa.

In some implementations, the macroblock manager 180 can update the macroblock data 182 based on the regions of the depth image projected to each macroblock. For example, the values of ΔQP for macroblocks identified with a face of a person may be decreased while other macroblocks associated with other parts of the person may have increased values of ΔQP.

The compression manager 190 is configured to perform a compression operation on each color image according to the macroblock data 182 to produce the compression data 192. The compression data 192 is transmitted to a receiver, where it is decompressed (decoded) and fused together to create a single color video image.

Figure 2:
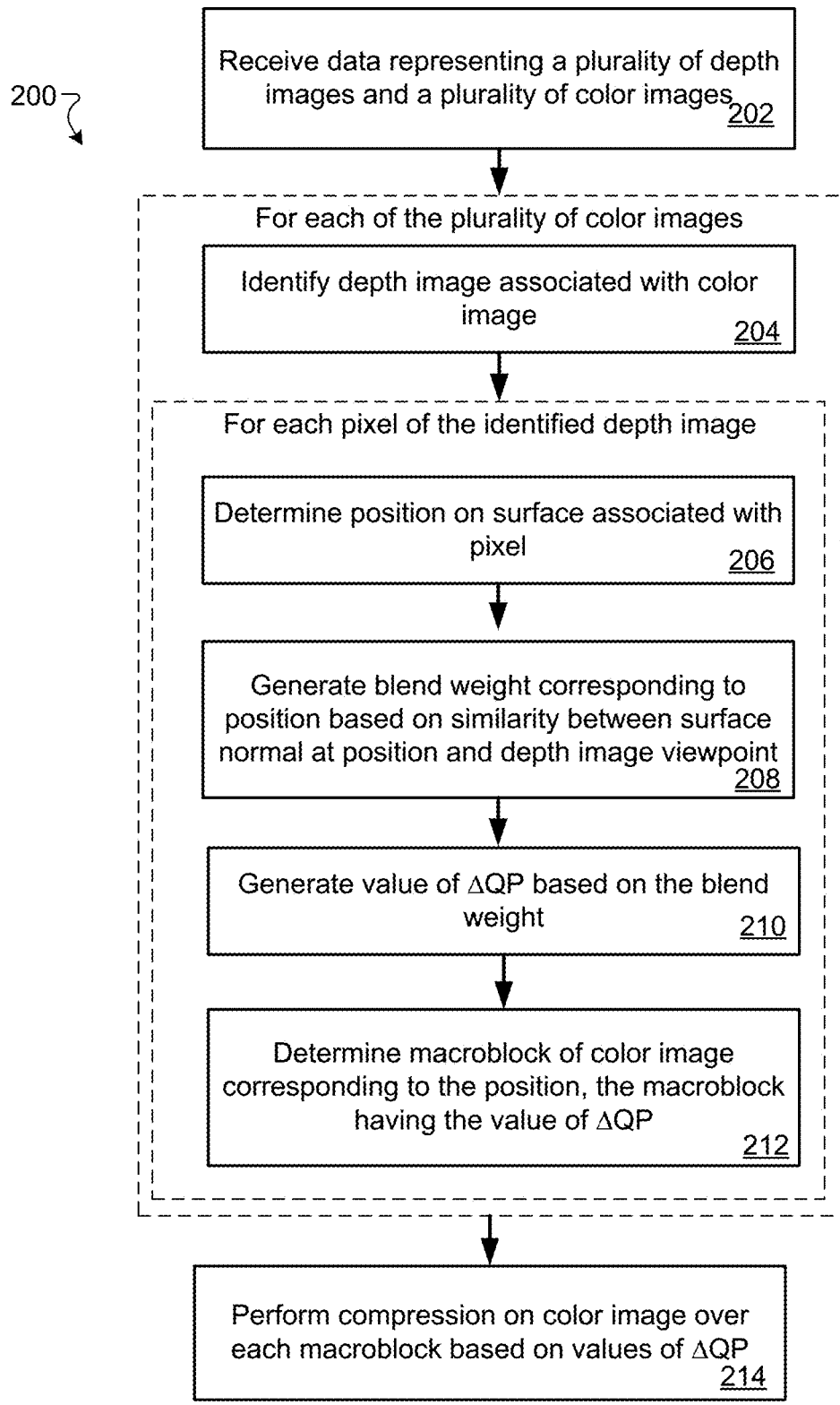
FIG. 2 is a flow chart that illustrates an example method of performing the technical solution within the electronic environment shown in FIG. 1.

FIG. 2 is a flow chart depicting an example method 200 of compressing color images. The method 200 may be performed by software constructs described in connection with FIG. 1, which reside in memory 126 of the user device computer 120 and are run by the set of processing units 124.

At 202, the depth image manager 130 receives depth image data 132 representing a plurality of depth images of an object, each of the plurality of depth images being a depth image of the object captured from a respective viewpoint, and the color image manager 140 receives color image data 142 representing a plurality of color images, each of the plurality of color images (a) being a color image of the object captured from a respective viewpoint and (b) having a plurality of macroblocks, each of the macroblocks corresponding to a respective region of the color image.

At 204, the depth image identification manager 150 identifies, for each of the plurality of color images, a depth image of the plurality of depth images associated with that color image. In some implementations, the associated depth image is chosen to be one with values of view parameters closest to those of the color image.

At 206, the blend weight manager 160, for each pixel of the depth image, determines a position of a surface of the object based on a depth value of the depth image associated with that pixel.

At 208, the blend weight manager 160, for each pixel of the depth image, generates a blend weight corresponding to the determined position, the blend weight being based on a similarity between a surface normal of the depth image at the position and the viewpoint from which the depth image was captured. A blend weight is computed for each color image based on the similarity between the surface normal and the direction from the surface point towards the color image viewpoint. These blend weights are then normalized (e.g. so they sum to unity), and the normalized blend weight associated with the current color image whose ΔQP value is computed is kept.

At 210, the quantization manager 170, for each pixel of the depth image, generates a value of a delta quantization parameter (ΔQP) based on the blend weight. As discussed above, each such value of ΔQP is stored in a pixel of a framebuffer.

At 212, the macroblock manager 180, for each pixel of the depth image, determines a macroblock of the plurality of macroblocks of the color image corresponding to the position, the macroblock being associated with the value of ΔQP for the pixel. As discussed above, the value of ΔQP for a macroblock is an aggregate of the values of ΔQP over all pixels in a tile of the framebuffer corresponding to the macroblock.

At 214, the compression manager 190 performs a compression operation on that color image, a compression ratio of each of the plurality of macroblocks of that color image being based on the value of ΔQP with which the macroblock is associated.

Figure 3A:
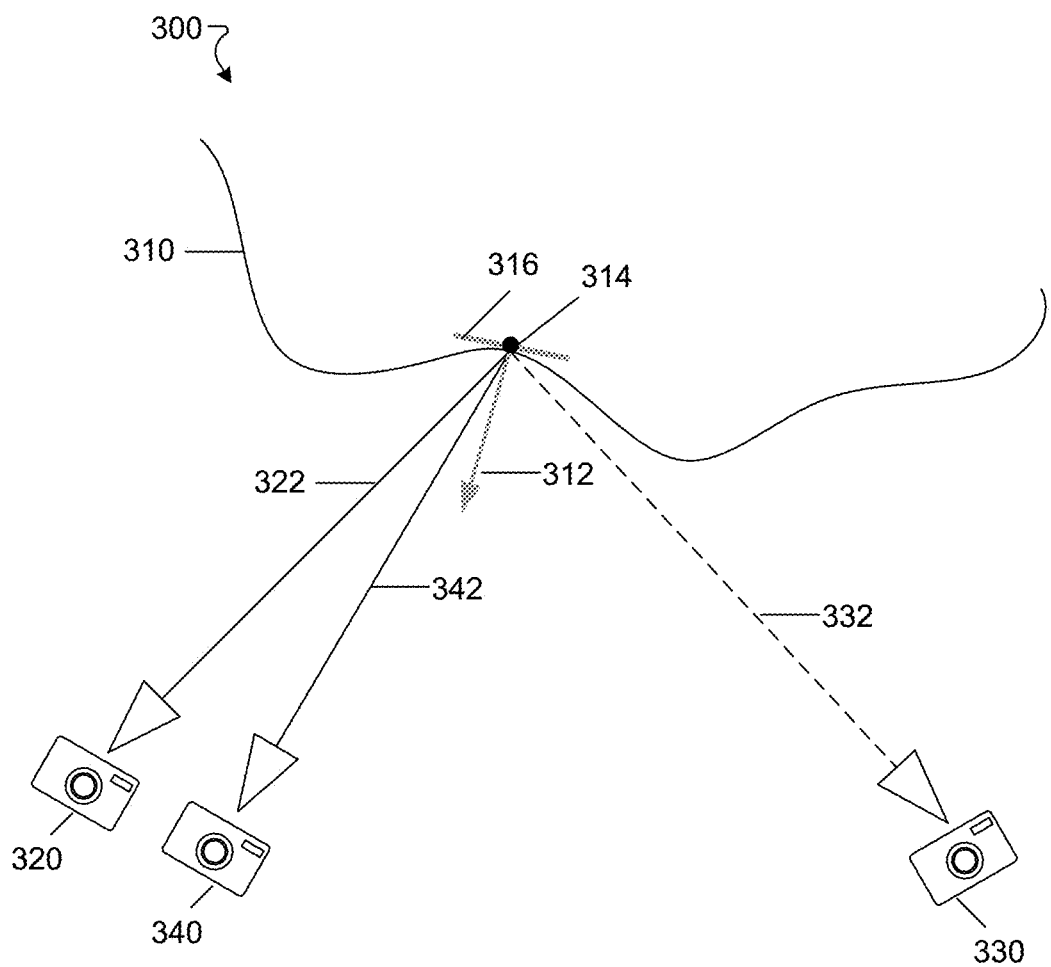
FIGS. 3A and 3B are diagrams that illustrate an example geometry for determining compression quality based on blend weights within the electronic environment shown in FIG. 1.

FIG. 3A is a diagram that illustrates an example geometry 300 for generating blend weights for a position 314 of the surface 310 of a depth image. FIG. 3A illustrates a pair of color image viewpoints 320 and 330 with respective orientations 322 and 332 as well as the viewpoint 340 of the depth image with orientation 342.

The point 314 is, as discussed above, determined from the depth value of the depth map corresponding to a pixel of the depth map. That is, the determination of the point 314 of the surface 310 is repeated for each pixel of the depth image and accordingly over the surface 310.

Also shown in FIG. 3A is a normal 312 to the surface 310 at the point 314. Denote the direction of the normal as n, the orientation 322 as $c_1$ and the orientation 324 as $c_2$. The weight corresponding to the color image with viewpoint 320 is given by $w_1 = (c_1 \cdot n)^e$ and the weight corresponding to the color image with viewpoint 330 is given by $w_2 = (c_2 \cdot n)^e$, where e is an exponent. In some implementations, the exponent e is specified. In some implementations, the exponent e is determined empirically based on target compression ratios.

As shown in FIG. 3A, the point 314 is better seen from viewpoint 320 than from viewpoint 330. Accordingly, $w_1 > w_2$. The color near the point 314 is kept at a high quality in the color image having the viewpoint 320. Further, when these color images are received at a receiver and decompressed, the color images will be combined according to the weights $w_1$ and $w_2$. For example, the normalized blend weights are $$w'_1 = \frac{w_1}{w_1 + w_2},$$

$$w'_2 = \frac{w_2}{w_1 + w_2}.$$

In some implementations, when there are more than two color views, then the denominators of the normalized blend weights are the sum of the blend weights over the color views. The normalized blend weight $w_1'$ is then used to compute the value of $\Delta QP$.

In some implementations, the normal 314 is computed according to the depth values in a neighborhood 316 of the point 314. In some implementations, the neighborhood 316 includes a grid of pixels including the pixel corresponding to the point 314. In some implementations, the grid is 5×5.

Figure 3B:
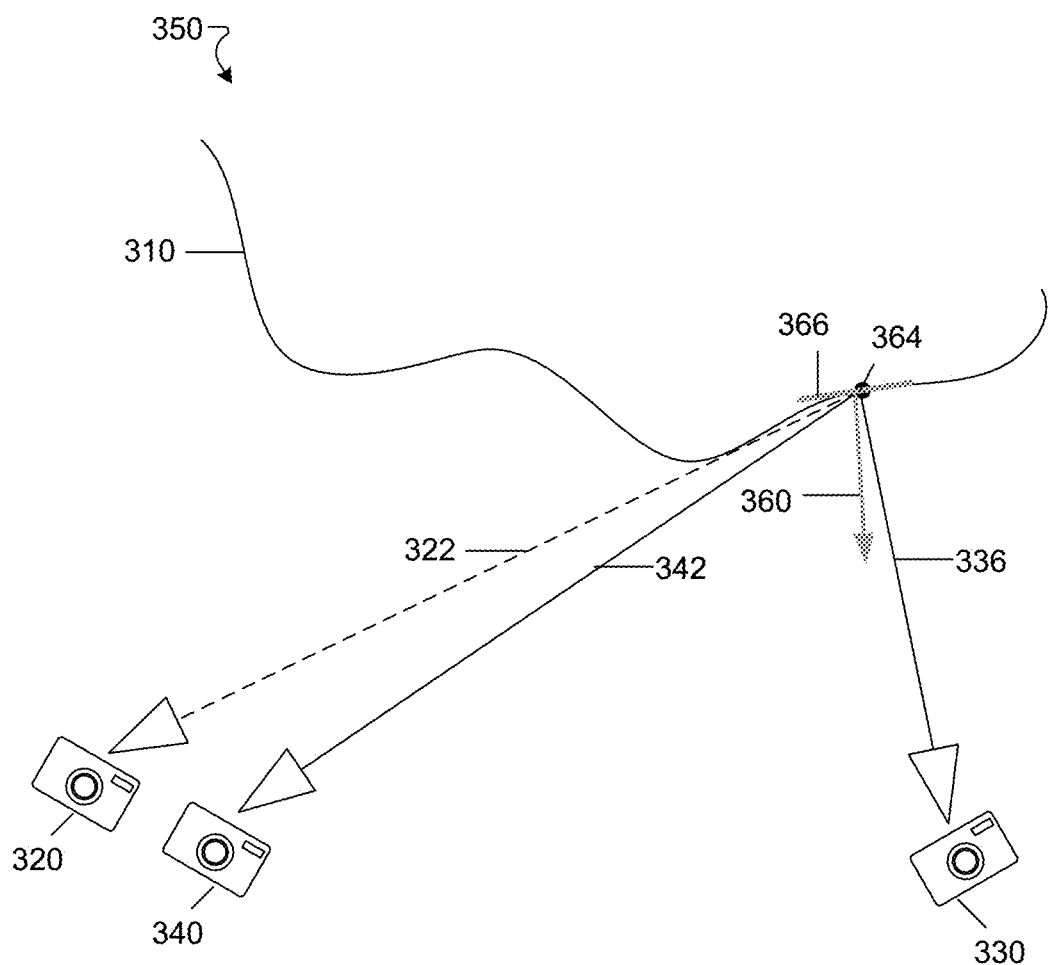

FIG. 3B is a diagram that illustrates an example geometry 350 for generating blend weights for a position 364 of the surface 310 of a depth image. FIG. 3B illustrates the pair of color image viewpoints 320 and 330 with respective orientations 322 and 336 as well as the viewpoint 340 of the depth image with orientation 342.

The point 364 is, as discussed above, determined from the depth value of the depth map corresponding to another pixel of the depth map. That is, the determination of the point 364 of the surface 310 is repeated for each pixel of the depth image and accordingly over the surface 310.

Also shown in FIG. 3A is a normal 360 to the surface 310 at the point 364. Denote the direction of the normal as n, the orientation 322 as $c_1$ and the orientation 324 as $c_2$. The weight corresponding to the color image with viewpoint 320 is given by $w_1=(c_1 \cdot n)^e$ and the weight corresponding to the color image with viewpoint 330 is given by $w_2=(c_2 \cdot n)^e$, where e is an exponent. In some implementations, the exponent e is specified. In some implementations, the exponent e is determined empirically based on target compression ratios.

As shown in FIG. 3B, the point 364 is better seen from viewpoint 330 than from viewpoint 320. Accordingly, $w_2 > w_1$. The color near the point 364 is kept at a high quality in the color image having the viewpoint 330. Further, when these color images are received at a receiver and decompressed, the color images will be combined according to the weights $w_1$ and $w_2$.

In some implementations, the normal 364 is computed according to the depth values in a neighborhood 366 of the point 364. In some implementations, the neighborhood 366 includes a grid of pixels including the pixel corresponding to the point 364. In some implementations, the grid is 5×5.

Figure 4:
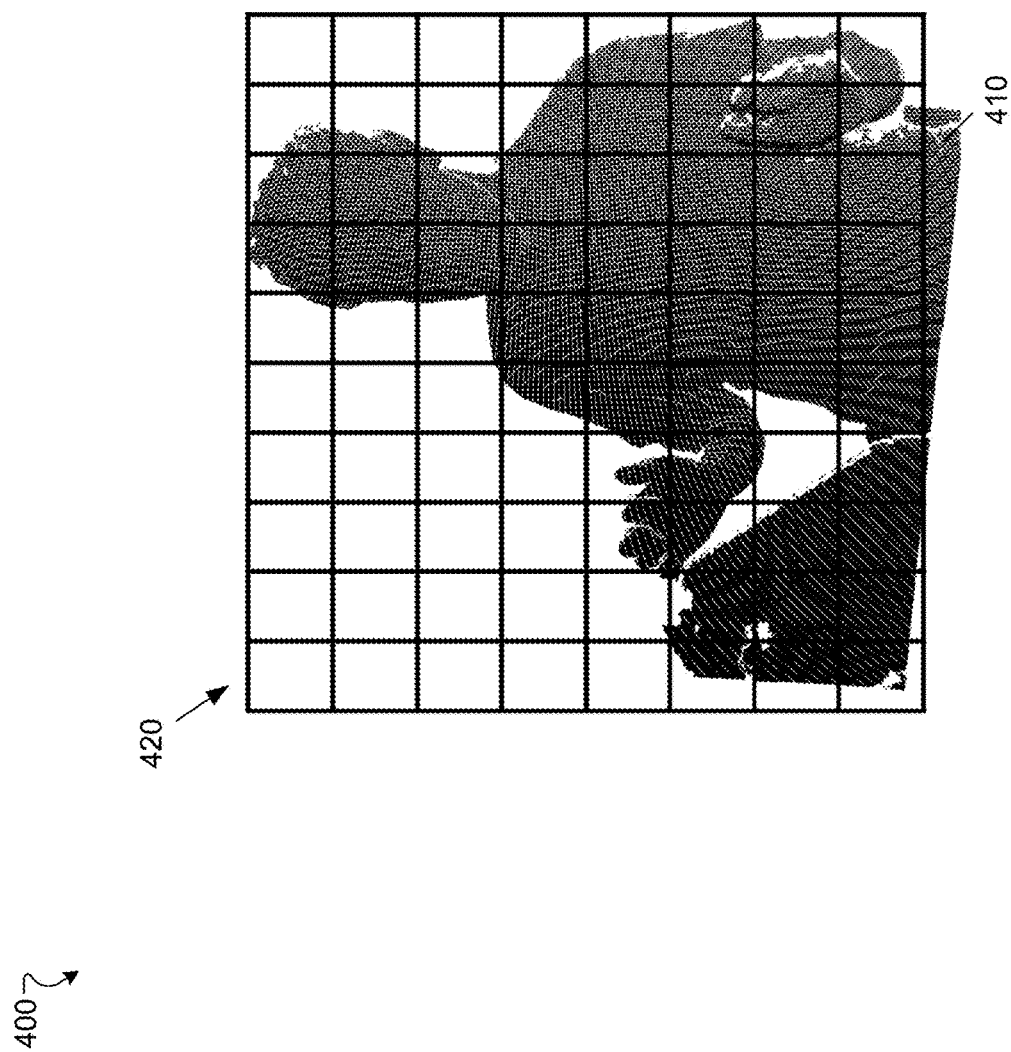
FIG. 4 is a diagram that illustrates example projections between surface points and macroblocks within the electronic environment shown in FIG. 1.

FIG. 4 is a diagram that illustrates an example that illustrates example projections between surface points (e.g., points 314 and 364) and macroblocks 420 of a color image associated with the depth image (e.g., depth image 310 having orientation 340). Note that each macroblock 420 is mapped from multiple pixels of the depth image so that each macroblock 420 contains a portion of the depth image.

Each macroblock 420 is associated with a value of $\Delta QP$, which in turn is determined from the respective blend weight of each pixel of the depth image. In some implementations, the value of $\Delta QP$ for a macroblock 420 depends on the values of the weights for all pixels mapped to the macroblock 420. In some implementations, the value of $\Delta QP$ for a macroblock 420 is based on a mean of the weights of the pixels mapped to the macroblock 420. In some implementations, the value of $\Delta QP$ for a macroblock 420 is based on a minimum of the weights of the pixels mapped to the macroblock 420. In some implementations, the value of $\Delta QP$ for a macroblock 420 is based on a maximum of the weights of the pixels mapped to the macroblock 420. In some implementations, the value of $\Delta QP$ for a macroblock 420 is based on a median of the weights of the pixels mapped to the macroblock 420.

In some implementations, the pixels of the depth or color image include identifiers identifying whether the portion of the depth image containing the pixels is associated with a region of importance (e.g., a face of a person). In such an implementation, the value of $\Delta QP$ is decreased for macroblocks 420 containing pixels having such an identifier. Conversely, in some implementations, the value of $\Delta QP$ is increased for macroblocks 420 containing pixels not having such an identifier.

Figure 5:
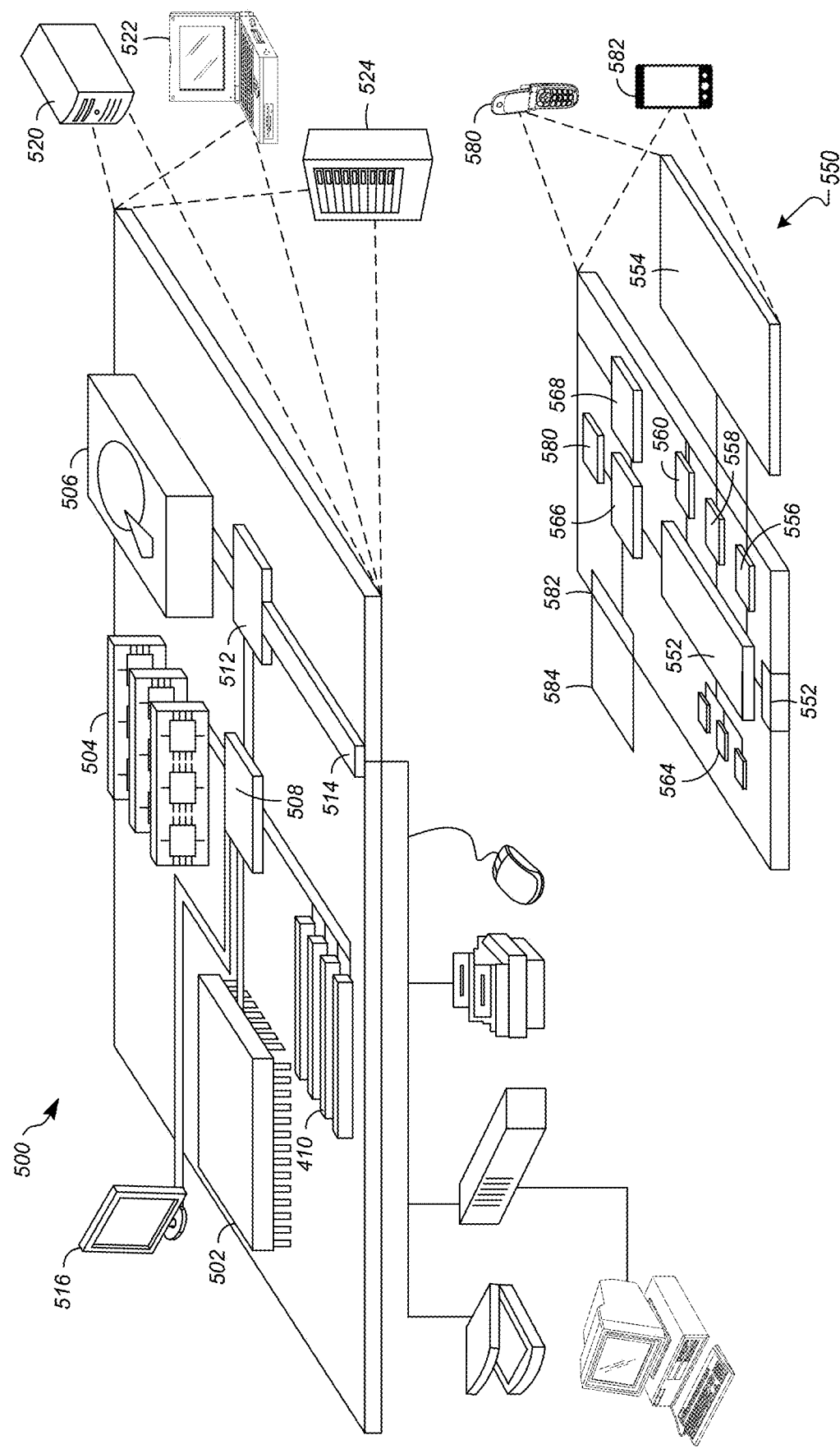
FIG. 5 illustrates an example of a computer device and a mobile computer device that can be used with circuits described here.

FIG. 5 illustrates an example of a generic computer device 500 and a generic mobile computer device 550, which may be used with the techniques described here.

As shown in FIG. 5, computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only.

In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 450, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Returning to FIG. 1, in some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the compression computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the compression computer 120.

The components (e.g., modules, processing units 124) of the compression computer 120 can be configured to operate based on one or more platforms (e.g., one or more similar or different platforms) that can include one or more types of hardware, software, firmware, operating systems, runtime libraries, and/or so forth. In some implementations, the components of the compression computer 120 can be configured to operate within a cluster of devices (e.g., a server farm). In such an implementation, the functionality and processing of the components of the compression computer 120 can be distributed to several devices of the cluster of devices.

The components of the computer 120 can be, or can include, any type of hardware and/or software configured to process attributes. In some implementations, one or more portions of the components shown in the components of the computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 120 can be, or can include, a software module configured for execution by at least one processor (not shown). In some implementations, the functionality of the components can be included in different modules and/or different components than those shown in FIG. 1.

Although not shown, in some implementations, the components of the computer 120 (or portions thereof) can be configured to operate within, for example, a data center (e.g., a cloud computing environment), a computer system, one or more server/host devices, and/or so forth. In some implementations, the components of the computer 120 (or portions thereof) can be configured to operate within a network. Thus, the components of the computer 120 (or portions thereof) can be configured to function within various types of network environments that can include one or more devices and/or one or more server devices. For example, a network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the computer 120 can be, or can include, processors configured to process instructions stored in a memory. For example, the depth image manager 130 (and/or a portion thereof), the color image manager 140 (and/or a portion thereof), the depth image identification manager 150 (and/or a portion thereof), the blend weight manager 160 (and/or a portion thereof), the QP manager 170 (and/or a portion thereof), the macroblock manager 180 (and/or a portion thereof), and the compression manager 190 (and/or a portion thereof) can be a combination of a processor and a memory configured to execute instructions related to a process to implement one or more functions.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
receiving (i) depth image data representing a plurality of depth images of an object, each of the plurality of depth images being a depth image of the object captured from a respective viewpoint, and (ii) color image data representing a plurality of color images, each of the plurality of color images (a) being a color image of the object captured from a respective viewpoint and (b) having a plurality of macroblocks, each of the macroblocks corresponding to a respective region of the color image;
for a color image from the plurality of color images:
identifying a depth image of the plurality of depth images associated with the color image;
for each pixel of the depth image:
determining a position of a surface of the object based on a depth value of the depth image associated with that pixel;
generating a value of a combination parameter corresponding to the determined position, the value of the combination parameter being based on a surface normal of the depth image at the position and the viewpoints from which the plurality of color images were captured;
generating a value of a delta quantization parameter based on the value of the combination parameter; and
determining a macroblock of the plurality of macroblocks of the color image corresponding to the position, the macroblock being associated with the value of the delta quantization parameter for the pixel; and
performing a compression operation on the color image, a compression ratio of each of the plurality of macroblocks of the color image being based on the value of the delta quantization parameter with which the macroblock is associated.

2. The method as in claim 1, wherein identifying the depth image associated with the color image includes:
determining the depth image of the plurality of depth images having a center of projection closest to a center of projection of that color image.

3. The method as in claim 1, wherein the value of the combination parameter for that pixel of the depth image is based on an inner product of a normal of the surface of the object at the position and the viewpoint from which the color image is captured.

4. The method as in claim 3, wherein the value of the combination parameter for that pixel is proportional to the inner product raised to the power of a specified exponent.

5. The method as in claim 1, wherein the value of the combination parameter for that pixel is further based on whether a point at the position of the surface is visible along the viewpoint from which the color image is captured.

6. The method as in claim 1, wherein the method further comprises:
for each of the plurality of pixels of the depth image, performing a rescaling operation on each of the blend weights for that pixel so that a sum of the values of the combination parameter across the plurality of color images at that pixel is equal to a specified constant value.

7. The method as in claim 1, wherein determining the macroblock of the plurality of macroblocks of the color image corresponding to the position includes:
projecting a point at the position of the surface into a color image plane in which an object capture device is situated, the object capture device being configured to capture the color image.

8. The method as in claim 7, wherein a macroblock of the plurality of macroblocks of the color image into which no points of the surface are projected has a value of the delta quantization parameter associated with a background pixel.

9. The method as in claim 7, further comprising:
performing a rasterization operation on the point into a framebuffer associated with the color image to store a new value of the delta quantization parameter stored in a pixel of a plurality of pixels of the framebuffer, the framebuffer also including a plurality of tiles, each of the plurality of tiles including a set of pixels of the plurality of pixels of the framebuffer;
performing a read operation on a tile of the plurality of tiles of the framebuffer to produce an aggregated value of the quantization parameter, the tile corresponding to a macroblock, the aggregated value of the parameter being based on the new values of the quantization parameter of the set of pixels of the tile; and
replacing the value of the delta quantization parameter with the aggregated value of the delta quantization parameter.

10. The method as in claim 7, further comprising:
identifying image content in the macroblock as a specified feature of the object; and
in response to the identification of the image content in the macroblock as a specified feature of the object, adjusting the value of the delta quantization parameter for the macroblock.

11. A computer program product comprising a nontransitive storage medium, the computer program product including code that, when executed by processing circuitry of a server computing device configured to compress video images of objects, causes the processing circuitry to perform a method, the method comprising:

receiving (i) depth image data representing a plurality of depth images of an object, each of the plurality of depth images being a depth image of the object captured from a respective viewpoint, and (ii) color image data representing a plurality of color images, each of the plurality of color images (a) being a color image of the object captured from a respective viewpoint and (b) having a plurality of macroblocks, each of the macroblocks corresponding to a respective region of the color image;

for a color image of the plurality of color images:
  identifying a depth image of the plurality of depth images associated with the color image;
  for each pixel of the depth image:
    determining a position of a surface of the object based on a depth value of the depth image associated with that pixel;
    generating a value of a combination parameter corresponding to the determined position, the value of the combination parameter being based on a surface normal of the depth image at the position and the viewpoints from which the plurality of color images were captured;
    generating a value of a delta quantization parameter based on the value of the combination parameter; and
    determining a macroblock of the plurality of macroblocks of the color image corresponding to the position, the macroblock being associated with the value of the delta quantization parameter for the pixel; and
  performing a compression operation on the color image, a compression ratio of each of the plurality of macroblocks of the color image being based on the value of the delta quantization parameter with which the macroblock is associated.

12. The computer program product as in claim 11, wherein identifying the depth image associated with the color image includes:
  determining the depth image of the plurality of depth images having a center of projection closest to a center of projection of that color image.

13. The computer program product as in claim 11, wherein the value of the combination parameter for that pixel of the depth image is based on an inner product of a normal of the surface of the object at the position and the viewpoint from which the color image is captured.

14. The computer program product as in claim 13, wherein the value of the combination parameter for that pixel is proportional to the inner product raised to the power of a specified exponent.

15. The computer program product as in claim 11, wherein the value of the combination parameter for that pixel is further based on whether a point at the position of the surface is visible along the viewpoint from which the color image is captured.

16. The computer program product as in claim 11, wherein the method further comprises:
  for each of the plurality of pixels of the depth image, performing a rescaling operation on each of the values of the combination parameter for that pixel so that a sum of the values of the combination parameter across the plurality of color images at that pixel is equal to a specified constant value.

17. The computer program product as in claim 11, wherein determining the macroblock of the plurality of macroblocks of the color image corresponding to the position includes:
  projecting a point at the position of the surface into a color image plane in which an object capture device is situated, the object capture device being configured to capture the color image.

18. The computer program product as in claim 17, wherein a macroblock of the plurality of macroblocks of the color image into which no points of the surface are projected has a value of the delta quantization parameter associated with a background pixel.

19. The computer program product as in claim 17, wherein the method further comprises:
  identifying image content in the macroblock as a specified feature of the object; and
  in response to the identification of the image content in the macroblock as a specified feature of the object, adjusting the value of the delta quantization parameter for the macroblock.

20. An electronic apparatus configured to compress video images of objects, the electronic apparatus comprising:
  memory; and
  controlling circuitry coupled to the memory, the controlling circuitry being configured to:
    receive (i) depth image data representing a plurality of depth images of an object, each of the plurality of depth images being a depth image of the object captured from a respective viewpoint, and (ii) color image data representing a plurality of color images, each of the plurality of color images (a) being a color image of the object captured from a respective viewpoint and (b) having a plurality of macroblocks, each of the macroblocks corresponding to a respective region of the color image;
    for a color image of the plurality of color images:
      identify a depth image of the plurality of depth images associated with the color image;
      for each pixel of the depth image:
        determine a position of a surface of the object based on a depth value of the depth image associated with that pixel;
        generate a value of a combination parameter corresponding to the determined position, the value of the combination parameter being based on a surface normal of the depth image at the position and the viewpoints from which the plurality of color images were captured;
        generate a value of a delta quantization parameter based on the value of the combination parameter; and
        determine a macroblock of the plurality of macroblocks of the color image corresponding to the position, the macroblock being associated with the value of the delta quantization parameter for the pixel; and
      perform a compression operation on the color image, a compression ratio of each of the plurality of macroblocks of the color image being based on the value of the delta quantization parameter with which the macroblock is associated.

* * * * *